US012406699B1

(12) United States Patent
Li et al.

(10) Patent No.: US 12,406,699 B1
(45) Date of Patent: Sep. 2, 2025

(54) PASSIVE AND ACTIVE GAS COMPENSATION TECHNIQUES FOR DATA STORAGE DEVICES (71) Applicant: Western Digital Technologies, Inc., San Jose, CA (US)

(72) Inventors: Dongying Li, San Jose, CA (US); Qing Dai, San Jose, CA (US); Sukumar Rajauria, San Jose, CA (US); Ruihua Li, Cupertino, CA (US); Yixiang Zhang, San Jose, CA (US); Mehdi Habibollahzadeh, San Jose, CA (US); Jung-Seo Park, San Jose, CA (US); Xiaokun Chew, San Juan Capistrano, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/581,343

(22) Filed: Feb. 19, 2024

(51) Int. Cl.
*G11B 33/14* (2006.01)

(52) U.S. Cl.
CPC ...... *G11B 33/1406* (2013.01); *G11B 33/1486* (2013.01)

(58) Field of Classification Search
None
See application file for complete search history.

(56) References Cited

U.S. PATENT DOCUMENTS

| 10,957,363 | B1* | 3/2021 | Brand | G11B 33/1486 |
|---|---|---|---|---|
| 11,024,343 | B2 | 6/2021 | Luebben et al. | |
| 11,270,739 | B1* | 3/2022 | Zhang | G11B 33/1453 |
| 11,355,161 | B2 | 6/2022 | Luebben et al. | |
| 11,763,853 | B2* | 9/2023 | Luebben | H05K 7/20 |
| | | | | 360/97.12 |
| 11,783,867 | B2* | 10/2023 | Luebben | G11B 33/1446 |
| | | | | 360/97.12 |
| 2005/0264926 | A1* | 12/2005 | Burts-Cooper | G11B 33/121 |
| 2009/0296271 | A1* | 12/2009 | Feliss | G11B 33/148 |
| | | | | 360/97.22 |
| 2015/0105250 | A1 | 4/2015 | Weston | |
| 2021/0043232 | A1* | 2/2021 | Luebben | H05K 5/0217 |
| 2021/0043233 | A1* | 2/2021 | Luebben | G11B 33/022 |
| 2021/0287719 | A1* | 9/2021 | Luebben | H05K 5/0217 |
| 2022/0148626 | A1* | 5/2022 | Luebben | H05B 1/0247 |
| 2022/0301596 | A1* | 9/2022 | Block | G11B 33/144 |
| 2022/0406341 | A1* | 12/2022 | Luebben | H05K 5/0217 |
| 2023/0335164 | A1* | 10/2023 | Luebben | H05K 5/0217 |
| 2024/0110901 | A1* | 4/2024 | Thomas | G11B 33/14 |

FOREIGN PATENT DOCUMENTS

CN 112337407 A * 2/2021 ........... B01D 53/228

* cited by examiner

*Primary Examiner* — William J Klimowicz (57) ABSTRACT

A data storage device may include a container comprising a gas-permeable membrane and a temperature-sensitive gas-releasing substance inside of the container. The temperature-sensitive gas-releasing substance is characterized by a gas-release profile wherein, below a critical temperature, the temperature-sensitive gas-releasing substance releases essentially none of a particular gas, and above the critical temperature, and within a range of expected operating temperatures of the data storage device, the temperature-sensitive gas-releasing substance releases the particular gas in quantities that generally increase with increasing temperature.

26 Claims, 6 Drawing Sheets

PASSIVE AND ACTIVE GAS COMPENSATION TECHNIQUES FOR DATA STORAGE DEVICES

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a need for write heads that incorporate higher magnetic moment materials, or techniques such as perpendicular recording (or both).

Another solution uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy (Ku) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR data storage device uses a laser source and an optical waveguide coupled to a near-field transducer (NFT) for heating the recording material on the media. A "near-field" transducer refers to "near-field optics," wherein light is passed through a first element with sub-wavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the media surface. An NFT may have a generally triangular output end, such that an evanescent wave generated at a surface of the waveguide couples to surface plasmons excited on the surface of the NFT, and a strong optical near-field is generated at the apex of the triangular output end.

One potential issue with HAMR devices is that excessive heating of the NFT can cause performance degradation and eventually failure of the data storage device. One possible cause of failure due to excessive heating may be due to adsorption of carbonaceous material on the slider overcoat near the NFT tip. Hydrocarbon molecules from the recording media overcoat and lubricant can become mobile at elevated temperatures and adsorb on the ABS of the slider. Over time, these molecules can form a "smear" that absorbs power from the laser source and causes the NFT, which normally operates at very high temperatures, to become even hotter than usual. The heat transfer can result in diffusion of the NFT metal until the NFT tip rounds and recording degrades, eventually possibly leading to failure of the data storage device.

Smear can contain materials such as carbon, silicon, and/or nitrogen. Consequently, if the smear is hot enough while in the presence of enough oxygen, it can oxidize and produce glassy products (e.g., materials that have amorphous, non-crystalline structures similar to that of glass, such as, e.g., $SiO_2$, NO, etc.) and/or carbon-based gases (e.g., CO, $CO_2$, etc.), or combinations thereof. The produced gases dissipate, and the HAMR head's laser light can typically penetrate the resulting glassy products (if present) without heating them, which provides the desired heating of the recording media while preventing excessive heating of the NFT, which can substantially improve the lifetime of the NFT. This oxidation process consumes oxygen molecules inside of the data storage device.

Many older data storage devices operate in a standard air (e.g., nitrogen, oxygen, and water vapor mixture) atmosphere. Spinning recording media in hard disk drives at high revolutions per minute against the friction of an air atmosphere is largely inefficient and requires a certain amount of power. To address this inefficiency, a data storage device can be filled at least partially with a lower-density gas, such as helium or hydrogen, and sealed to control and maintain the internal environment of the data storage device. Sealing mitigates or prevents leakage of internal gases from within the data storage device. The use of helium, which has a density that is approximately one-seventh that of air, reduces friction and vibration in the data storage device, thereby creating less drag and turbulence. Consequently, by running the data storage device in a less-dense atmosphere, such as an atmosphere of helium or a mixture of helium and oxygen, friction on the recording media is reduced, thereby causing the recording media to require less power in order to spin at a similar rate as the recording media in data storage devices that operate in standard air conditions. The use of helium generally also reduces the operating temperature of the data storage device, as well as the amount of noise it generates.

Smear is common in data storage devices that are sealed and contain helium, because there are far fewer oxygen molecules in such devices than in standard-atmosphere data storage devices. One side-effect of the (desirable) oxidation of smear in a sealed data storage device is that it consumes oxygen molecules sealed within the interior of the data storage device, which reduces the number of oxygen molecules available for oxidation as the data storage device ages. In addition to the oxidation of smear, other components in data storage devices can consume oxygen via oxidation (e.g., platter surface oxidation, connector and/or interface oxidation, PCB oxidation, head and/or actuator oxidation, etc.). As a result, the quantity of oxygen molecules available may eventually be insufficient to promote oxidation of the smear, which can cause the data storage device to fail. The loss rate of oxygen also tends to be exacerbated as the temperature of the data storage device increases.

Therefore, there is a need for improvements.

SUMMARY

This summary represents non-limiting embodiments of the disclosure. It is to be appreciated that although portions of the discussion herein refer specifically to replenishment of oxygen, the disclosed techniques are generally applicable to compensate for loss or consumption of gases in general. The disclosures are not limited to oxygen compensation.

In some aspects, the techniques described herein relate to a data storage device, including: a container including a gas-permeable membrane, and a temperature-sensitive gas-releasing substance inside of the container, wherein the temperature-sensitive gas-releasing substance is characterized by a gas-release profile wherein below a critical temperature, the temperature-sensitive gas-releasing substance releases essentially none of a particular gas, and above the critical temperature, and within a range of expected operating temperatures of the data storage device, the temperature-sensitive gas-releasing substance releases the particular gas in quantities that generally increase with increasing temperature.

In some aspects, the particular gas is oxygen.

In some aspects, the temperature-sensitive gas-releasing substance includes at least one of a permanganate, a peroxide, a perchlorate, a perborate, a persulfate, or a percarbonate.

In some aspects, the temperature-sensitive gas-releasing substance includes at least one of: $AgMnO_4$, $KMnO_4$, $H_2O_2$, $CaO_2$, $MgO_2$, $KClO_3$, $NaBO_3 \cdot H_2O$, $K_2S_2O_8$, or $Na_2CO_3 \cdot 1.5H_2O_2$.

In some aspects, the temperature-sensitive gas-releasing substance includes a metal-organic framework. In some aspects, the metal-organic framework includes at least one of: Cu-BTC, MIL-101 Composite, UMCM-152 (ANUGIA), or Mg-MOF-74.

In some aspects, the critical temperature is between about 40 degrees Celsius and about 200 degrees Celsius.

In some aspects, an amount of the temperature-sensitive gas-releasing substance inside of the container is selected such that the temperature-sensitive gas-releasing substance is capable of releasing a quantity of the particular gas that is substantially equal to an expected amount of the particular gas to be consumed by one or more components of the data storage device during a specified period of time. In some aspects, the specified period of time is an expected lifetime or warranty period of the data storage device. In some aspects, the specified period of time is at least 5 years.

In some aspects, the critical temperature is a first critical temperature, and wherein, at temperatures above a second critical temperature, the second critical temperature being higher than the first critical temperature and within the range of expected operating temperatures of the data storage device, the temperature-sensitive gas-releasing substance releases larger quantities of gas than at temperatures between the first critical temperature and the second critical temperature. In some aspects, the first critical temperature is between about 50 degrees Celsius and about 100 degrees Celsius, and the second critical temperature is between about 100 degrees Celsius and about 300 degrees Celsius.

In some aspects, the data storage device further includes a voice coil including a winding, and a current generator coupled to the voice coil and configured to cause a current to flow through the winding, wherein the container is situated within a core area of the winding. In some aspects, the critical temperature of the temperature-sensitive gas-releasing substance is less than an expected temperature within the core area during an operational state of the data storage device. In some aspects, the operational state is a state in which the current flows through the winding. In some aspects, the operational state is a seeking state.

In some aspects, the data storage device further includes a controller configured to cause the current generator to generate the current to heat the temperature-sensitive gas-releasing substance to a temperature above the critical temperature.

In some aspects, the data storage device further includes a controller configured to: determine that the data storage device is in a state in which a voice coil motor current can be increased, and, in response to determining that the data storage device is in the state in which the voice coil motor current can be increased, cause the current generator to generate the current to heat the temperature-sensitive gas-releasing substance while the data storage device is in the state in which the voice coil motor current can be increased. In some aspects, in the state in which the voice coil motor current can be increased, (a) a slider of the data storage device is parked, or (b) a recording head of the data storage device is over a recording media of the data storage device but is not reading from or writing to the recording media.

In some aspects, the data storage device further includes a thermocouple coupled to the container and configured to detect a temperature in a vicinity of the temperature-sensitive gas-releasing substance, and a controller coupled to the thermocouple and configured to cause the current generator to generate the current in response to the detected temperature in the vicinity of the temperature-sensitive gas-releasing substance.

In some aspects, the techniques described herein relate to a method of replenishing consumed gas within a sealed data storage device, the sealed data storage device including a container situated within a core area of a voice coil winding, the container containing a temperature-sensitive gas-releasing substance having a critical temperature below which the temperature-sensitive gas-releasing substance releases essentially none of a particular gas, and above which the temperature-sensitive gas-releasing substance releases the particular gas in quantities that generally increase with increasing temperature, wherein an amount of the temperature-sensitive gas-releasing substance is capable of releasing a quantity of the particular gas expected to be consumed as the sealed data storage device operates, the method including: applying a current through the voice coil winding, thereby increasing a temperature of the temperature-sensitive gas-releasing substance above the critical temperature, thereby causing the temperature-sensitive gas-releasing substance to release molecules of the particular gas.

In some aspects, applying the current through the voice coil winding is performed when the sealed data storage device is in a state in which a voice coil motor current can be increased.

In some aspects, the method further includes detecting that the sealed data storage device is in the state in which a voice coil motor current can be increased. In some aspects, in the state in which the voice coil motor current can be increased, (a) a slider of the sealed data storage device is parked, or (b) a recording head of the sealed data storage device is over a recording media of the sealed data storage device but is not reading from or writing to the recording media.

In some aspects, the method further includes detecting a temperature or a quantity of the particular gas within the sealed data storage device, and applying the current through the voice coil winding is in response to detecting the temperature or the quantity of the particular gas within the sealed data storage device.

In some aspects, the techniques described herein relate to a method of manufacturing a data storage device, the method including: placing a temperature-sensitive gas-releasing substance inside of a container, wherein the temperature-sensitive gas-releasing substance is capable of releasing a quantity of a particular gas, the quantity of the particular gas being sufficient to replace an amount of the particular gas expected to be consumed as the data storage device operates; placing a gas-permeable membrane over an opening of the container, the gas-permeable membrane allowing molecules of the particular gas to escape from the container and preventing the temperature-sensitive gas-releasing substance from leaving the container; and sealing the data storage device.

In some aspects, the temperature-sensitive gas-releasing substance includes a metal-organic framework, and the method further includes charging the metal-organic framework.

In some aspects, the method further includes situating the container within a core area of a voice coil winding of the data storage device.

BRIEF DESCRIPTION OF THE DRAWINGS

Objects, features, and advantages of the disclosure will be readily apparent from the following description of certain embodiments taken in conjunction with the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are passive and active techniques to compensate for the loss of a gas (e.g., oxygen) as a data storage device (e.g., a sealed device, such as a hard disk drive) operates. A gas-releasing substance is included in the data storage device. The gas-releasing substance can be, for example, a compound that can release oxygen in response to heat (e.g., a permanganate (e.g., $AgMnO_4$, $KMnO_4$), a peroxides (e.g., $H_2O_2$, $CaO_2$, $MgO_2$), a perchlorate (e.g., $KClO_3$), a perborate (e.g., $NaBO_3 \cdot H_2O$), a persulfate (e.g., $K_2S_2O_8$), a percarbonate (e.g., $Na_2CO_3 \cdot 1.5H_2O_2$), etc.). The gas-releasing substance can be, for example, a metal-organic framework that releases stored gas in response to heat, exposure to light, or exposure to a magnetic field. The gas-releasing substance releases gas into the interior of the data storage device over time. The quantity and identity of the gas-releasing substance (e.g., which material or combination of materials, such as a specific compound, a specific MOF, etc., and how much of it to include in the data storage device) can be selected based on, for example, the rate of gas release the gas-releasing substance provides and/or the amount of the gas-releasing substance that would be needed to release a specified quantity of a particular gas (e.g., oxygen). For example, the identity and quantity of the gas-releasing substance can be selected based on the expected loss/consumption of the particular gas within the data storage device. Thus, the identity (which material(s)) and/or quantity (how much of the material(s)) of the gas-releasing substance can be design parameters for the data storage device.

In some embodiments, the gas-releasing substance's release of gas into the interior of the data storage device is temperature-dependent. In some embodiments, the gas-releasing substance releases gas whenever its temperature exceeds a threshold temperature. In some embodiments, the quantity of gas released and/or the rate of gas released per unit time by the gas-releasing substance increases as the temperature increases over the expected range of operating temperatures of the data storage device. As a result, by appropriate selection of the identity and quantity of the gas-releasing substance, the released gas can compensate substantially in real time for gas consumed by components of the data storage device.

The gas-releasing substance can be situated anywhere in the data storage device where there is sufficient room. In some embodiments, the gas-releasing substance is placed in a location that is known to have a temperature that at least reaches a threshold temperature (e.g., during ordinary operation of the data storage device), the threshold temperature being a temperature at which the gas-releasing substance releases the gas.

The gas-releasing substance can be included in a container within the data storage device. The container can have a permeable membrane or barrier (e.g., similar to an air filter) that allows gas to escape from the container but prevents the gas-releasing substance itself from leaving the container. In some embodiments, the container is situated near or inside of a voice coil.

Some of the techniques disclosed herein are passive techniques, meaning that they provide autonomous gas compensation, as a matter of course and without intervention, as the data storage device operates. Passive techniques operate by the selected gas-releasing substance releasing gas in response to the internal temperature of the data storage device. By matching the identity and quantity of the gas-releasing device to the expected gas consumption inside of the data storage device, passive techniques provide an elegant, cost-effective solution to compensate for gas consumption.

Other techniques disclosed herein are active techniques, meaning that gas compensation can be (but is not necessarily) managed and/or controlled. For example, some of the techniques provide for the temperature of (or in the vicinity of) the gas-releasing substance to be controlled such as by deliberately heating the gas-releasing substance. Active techniques provide some level of control or management of gas release, even if the control or management is not exercised.

Some of the discussion herein is in the context of oxygen replenishment, but it is to be understood that the disclosures are not limited to compensating for oxygen consumption. In general, the described techniques can be used to replenish any particular gas or combination of gases.

Figure 1:
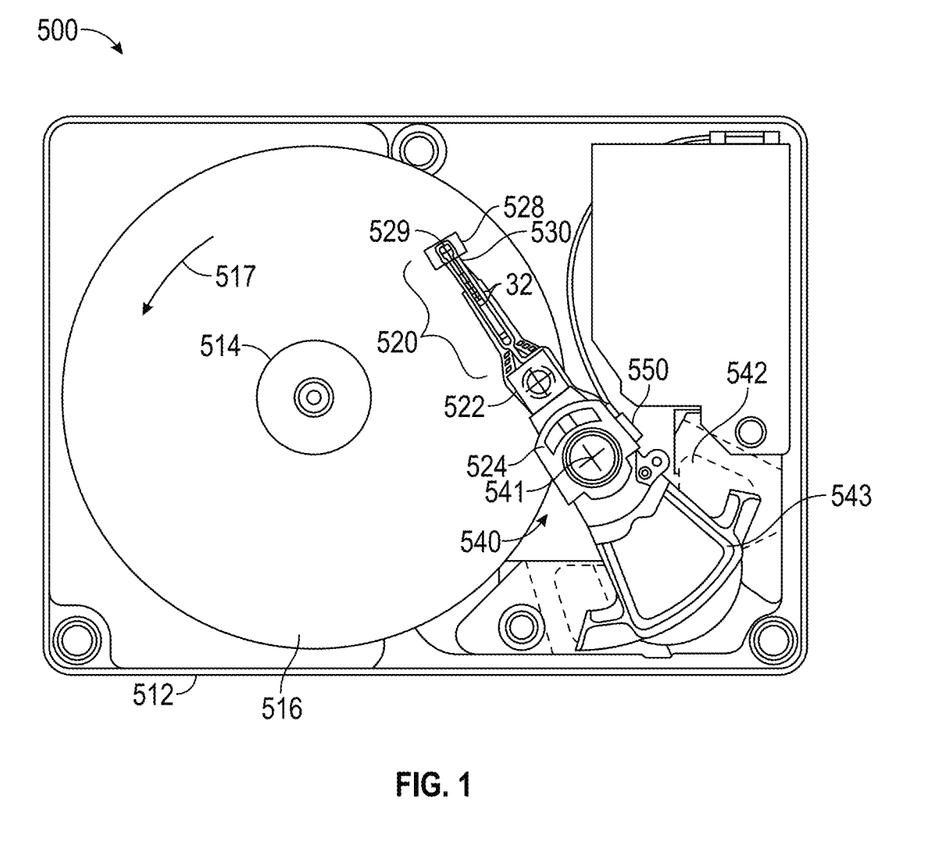
FIG. 1 is a top view of an example of a data storage device into which embodiments disclosed herein can be incorporated.

FIG. 1 is a top view of an example of a data storage device 500 (e.g., a HAMR data storage device or another type of data storage device) into which embodiments disclosed herein can be incorporated. FIG. 1 illustrates a head/disk assembly of the data storage device 500 with the cover removed. The data storage device 500 includes a rigid base 512 supporting a spindle 514 that supports a recording media 516 (or multiple recording media 516). The spindle 514 is rotated by a spindle motor (see FIG. 2), which, in operation, rotates the recording media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to a slider 528, which is typically formed of a composite material, such as a composite of alumina/titanium-carbide ($Al_2O_3$/TIC).

A recording head 529 for recording to a recording media 516 is located at the end or trailing surface of the slider 528. The recording head 529 comprises a read portion for reading from the recording media 516 and a write portion for writing to the recording media 516. FIG. 1 illustrates only one recording media 516 surface with the slider 528 and recording head 529, but there may be multiple recording media 516 stacked on a hub that is rotated by the spindle motor, with a separate slider 528 and recording head 529 associated with each surface of each recording media 516.

As the recording media 516 rotates, the recording media 516 drags gas (which may be air, helium, etc.) under the slider 528 in a direction approximately parallel to the tangential velocity of the recording media 516. The slider 528 has a media-facing air-bearing surface (ABS) that causes the slider 528 to ride on a cushion or bearing of gas, typically air, mostly helium, or hydrogen, generated by rotation of the recording media 516. (It is to be understood that the term "air-bearing surface (ABS)" is used herein to refer to the gas-bearing surface of a slider, regardless of whether the gas within the drive is air or another gas (e.g., predominantly helium) or a mixture of gases.) As the air or gas passes under the slider 528 ABS, compression of the air or gas along the air flow path causes the air pressure between the recording media 516 and the slider 528 to increase, which creates a hydrodynamic lifting force that counteracts the tendency of the at least one load beam assembly 520 to push the slider 528 toward the recording media 516. The slider 528 thus flies above the recording media 516 but in close proximity to the surface of the recording media 516. The flexure 530 enables the slider 528 to "pitch" and "roll" on the air (or gas) bearing generated by the recording media 516 as it rotates. Thus, during normal operation, the recording head 529 remains slightly above the surface of the recording media 516, riding on the air bearing.

The data storage device 500 of FIG. 1 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. The voice coil 543 is a coil of wire attached to the recording head 529 assembly. It is situated within the magnetic field of the magnet assembly 542. The voice coil 543 is mounted on the rotary actuator assembly 540. As the electric current varies in the voice coil 543, the resulting magnetic field interacts with the magnet assembly 542, causing a force that moves the entire rotary actuator assembly 540. The movement of the rotary actuator assembly 540 positions the recording head 529 over the desired data track on the recording media 516.

When energized by control circuitry, which may include, for example, a processor, the voice coil 543 moves and thereby rotates E-block 524 with the rigid arms 522 and the at least one load beam assembly 520 to position the recording head 529 over the data tracks on the recording media 516. As the recording media 516 rotates in the direction of the curved arrow 517 shown in FIG. 1, the movement of the rotary actuator assembly 540 allows the recording head 529 on the slider 528 to access different data tracks on the recording media 516. The process of moving the recording head 529 to the correct track is known as "seeking."

The array 32 of electrically conductive interconnect traces or lines connects at one end to the recording head 529 and at its other end to read/write circuitry contained in an electrical module or chip 550, which, in the data storage device 500 of FIG. 1, is secured to a side of the E-block 524. The chip 550 includes a read/write integrated circuit (R/W IC). The chip 550 may include a controller (e.g., as part of the R/W IC or external to it). The chip 550 may assist in the implementation of the techniques described herein.

To read information from the recording media 516, the recording head 529 may include at least one read head or read sensor. The read sensor(s) in the recording head 529 may include, for example, one or more giant magnetoresistance (GMR) sensors, tunneling magnetoresistance (TMR) sensors, or another type of magnetoresistive sensor. When the slider 528 passes over a track on the recording media 516, the recording head 529 (via the read head) detects changes in resistance due to magnetic field variations recorded on the recording media 516, which represent the recorded bits.

To write information to the recording media 516, the recording head 529 includes a write head (or write portion). In general, the write head can be any suitable write head. Some of the examples included herein describe and illustrate a HAMR head, but it is to be appreciated that the disclosed techniques are applicable to other types of recording head 529.

In operation, after the voice coil 543 has positioned the recording head 529 over the data tracks on the recording media 516, the recording head 529 may be used to write information to one or more tracks on the surface of the recording media 516 and to read previously-recorded information from the tracks on the surface of the recording media 516. The tracks may comprise discrete data islands of magnetizable material (e.g., bit-patterned media), or the recording media 516 may have a conventional continuous magnetic recording layer of magnetizable material. Processing circuitry in the data storage device 500 (e.g., on the chip 550) provides to the recording head 529 signals representing information to be written to the recording media 516 and receives from the recording head 529 signals representing information read from the recording media 516.

As explained above, smear can be a problem for data storage devices 500 (e.g., HAMR devices). As also explained above, oxygen molecules in a sealed data storage device 500 tend to be consumed (e.g., the amount of oxygen decreases) as the data storage device 500 ages, which can make smear more of a problem the longer the data storage device 500 is in operation. The rate of loss of oxygen is generally proportional to temperature.

What is needed are devices and techniques that allow additional oxygen to be introduced into a sealed data storage device 500 as it operates (e.g., to compensate for or replace oxygen lost/consumed as the data storage device 500 operates). Such techniques are described herein. Although the some of the discussion herein assumes that the gas lost/consumed during operation of the data storage device 500 is oxygen, it is to be appreciated that the disclosure is applicable to other gases or combinations of gases. Thus, generally speaking, the disclosures herein concern the replenishment of gas (either a single gas or a mixture of gases) as a data storage device 500 (e.g., a sealed data storage device 500) operates/ages. In some embodiments, the replenishment is passive and occurs as a result of temperature changes inside of the data storage device 500. In some embodiments, the replenishment is active and occurs as the result of an intervention (e.g., by a processor, such as to cause a temperature increase inside of the data storage device 500). In some embodiments, the disclosed techniques replenish oxygen consumed by oxidation and/or other processes.

Figure 2:
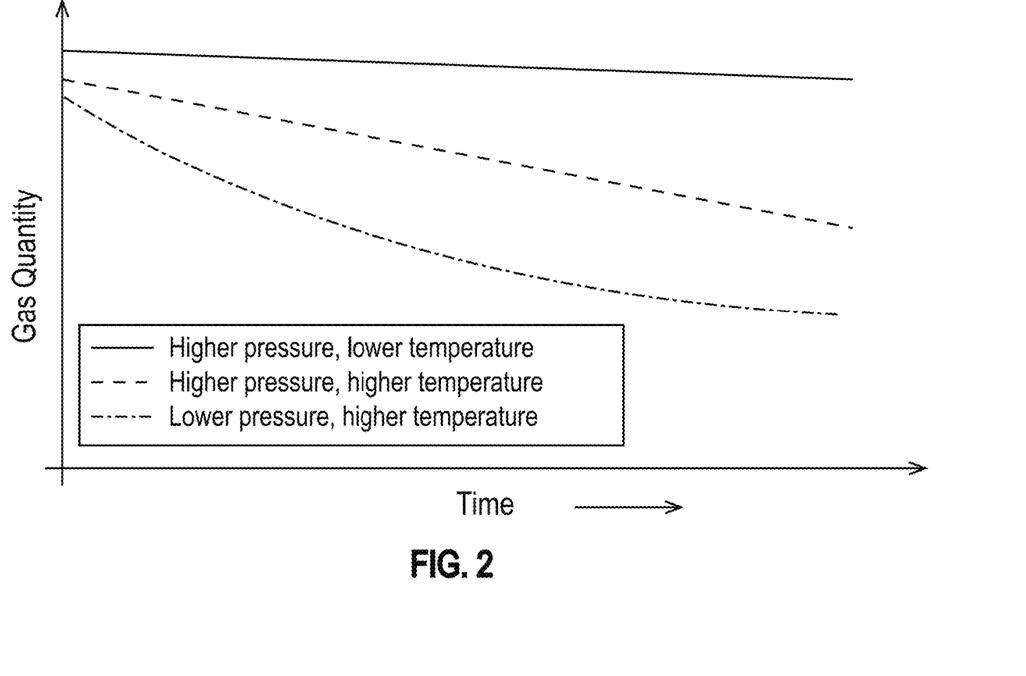
FIG. 2 is a plot illustrating general trends of gas consumption by a sealed data storage device as it operates.

FIG. 2 is a plot illustrating general trends of gas consumption by a sealed data storage device 500 as it operates. The x-axis represents time, and the y-axis represents the amount of a gas (e.g., oxygen) in the data storage device 500. The plot in FIG. 2 shows the effects over time of temperature and pressure on gas consumption, in particular to show the effects of higher and lower pressures, and higher and lower temperatures. The solid curve represents the gas-consumption trend when the pressure inside the data storage device 500 is at a higher level, and the operating temperature is at a lower level. As shown, in a higher pressure, lower temperature condition, the amount of gas in the data storage device 500 decreases over time, but the consumption is relatively slow and consistent.

The dashed curve represents the trend when the pressure inside the data storage device 500 is at the higher level (same as for the solid curve), but the temperature is higher than for the solid curve. As shown, the effect of the higher temperature is that gas is consumed more rapidly than when the temperature is lower. Thus, FIG. 2 indicates that gas is consumed at a higher rate when the temperature is higher, even when the pressure remains constant.

The dash-dot curve in FIG. 2 shows the effect of lower pressure. The dash-dot curve represents the trend when the pressure inside the data storage device 500 is lower than for the solid or dashed curves, and the temperature is higher (same as for the dashed curve). Under these conditions, the rate of gas consumption is even higher. A comparison between the dashed and the dash-dot curves shows that the effect of the lower pressure is that more gas is consumed per unit time. In a sense, the dash-dot curve represents a worst-case scenario of lower pressure and higher temperature.

The inventors named herein had the insight that a data storage device 500 can be improved by compensating for the consumption of gas (a single gas or mixture of gases) as the data storage device 500 operates, and that such compensation can be accomplished either passively or actively. For example, passive compensation can be accomplished by including in the data storage device 500 a gas-releasing substance that releases gas to replace gas being consumed as the data storage device 500 operates, where the quantity is selected to provide the amount of gas expected to be consumed by the data storage device 500 over its lifetime, during its warranty period, or over any predetermined time period. For example, the gas-releasing substance can release a quantity of gas the data storage device 500 is expected to consume over a particular number of years (e.g., 3 years, 4, years, 5 years, 6 years, etc.). As a specific example, the gas-releasing substance can release a quantity of gas the data storage device 500 is expected to consume over at least 5 years. Because, as shown by FIG. 2, the consumption of gas within the data storage device 500 is temperature-dependent and pressure-dependent, the identity of the gas-releasing substance (which material(s)) and the amount of the gas-releasing substance can be selected during the design process so that as the data storage device 500 operates, and molecules of the gas originally present are consumed (e.g., for oxidation of smear, etc.), the consumed molecules are replaced by molecules of gas released by the gas-releasing substance. The identity and quantity of the gas-releasing substance can be selected so that the release of gas under the expected temperature and pressure conditions substantially matches the consumption of gas. In other words, the gas-release profile of the gas-releasing substance can be matched to the expected operating conditions so that the total amount of the gas inside of the data storage device 500 remains substantially consistent, because consumed gas is being replenished at substantially the rate of consumption.

As a specific example, a temperature-sensitive gas-releasing substance can be situated within a core area of the voice coil 543 winding. When current flows through the voice coil 543 winding, the core area is heated due to resistive heating (i.e., the current encounters resistance as it passes through the metal voice coil 543 winding, which causes the metal to heat up and heat the area around it). Current flow through the voice coil 543 winding occurs as a matter of course as the data storage device 500 operates (e.g., when it is seeking). Thus, the heat naturally generated by the voice coil 543 during the ordinary operation of the data storage device 500 (e.g., during seeking operations) may be able to heat the gas-releasing substance to above a critical temperature and cause it to release gas to replenish gas consumed by the data storage device 500 (e.g., via oxidation and other processes). For example, the gas-releasing substance may release gas at a rate that is substantially similar to the rate at which the data storage device 500 consumes the gas over the expected operating temperature range. In this way, gas consumed by the data storage device 500 can be replenished passively, substantially in real time, as the data storage device 500 operates and consumes the gas.

Active compensation can be accomplished by including hardware and/or software in the data storage device 500 that can cause the gas-releasing substance to release gas (or to release more gas than it ordinarily would) at a selected time and/or under specified conditions. For example, the gas-releasing substance can be situated in a core area of the voice coil 543 winding of a data storage device 500. A controller in the data storage device 500 can cause current (or additional current) to flow through the voice coil 543 winding when the data storage device 500 is in a state in which the current can be increased for the purpose of heating the core area in order to heat the gas-releasing substance and cause it to release gas. If present, the controller can be coupled to a temperature sensor (e.g., a thermocouple) that can detect the temperature of (or in the vicinity of) the gas-releasing substance. Alternatively or in addition, the controller can be coupled to a sensor that detects the gas level (or a proxy for the gas level). The controller can then determine how much current to apply to the voice coil 543 winding, and for how long, to cause the gas-releasing substance to release a specified amount of gas, or to release gas at a particular rate (e.g., determined by the gas-release profile).

Figure 3A:
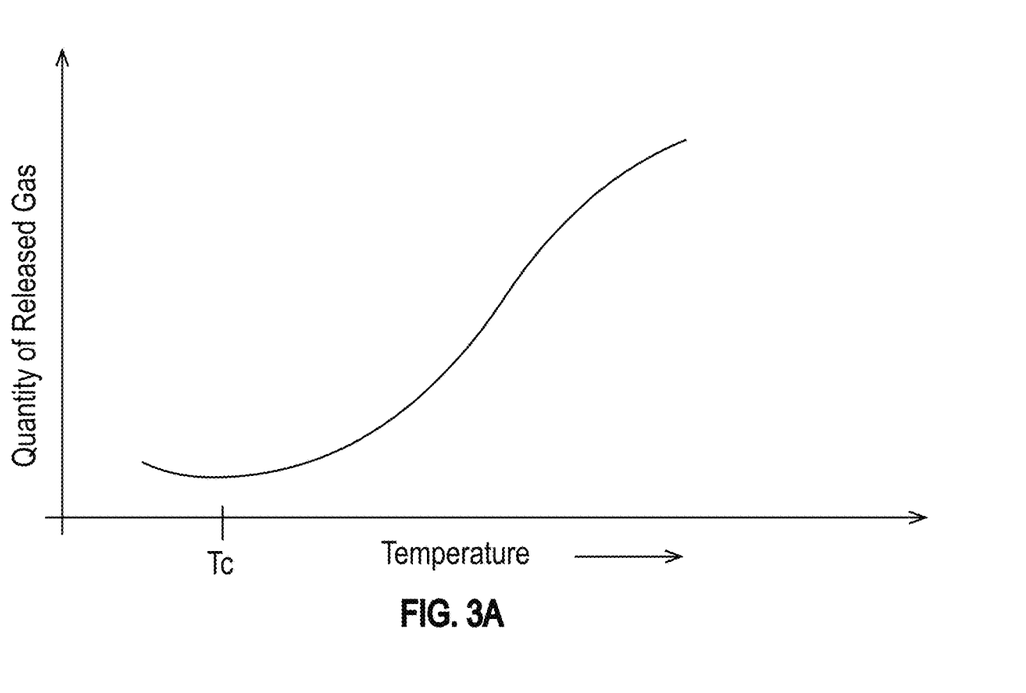
FIG. 3A is a plot showing a gas-release profile of a gas-releasing substance suitable for use in accordance with some embodiments.

FIG. 3A is a plot showing a gas-release profile of a gas-releasing substance suitable for use in accordance with some embodiments. The gas-release profile describes the amount (or rate) of gas released by the gas-releasing substances as a function of temperature under specified conditions (e.g., pressure). In other words, the gas-releasing substance is characterized by the gas-release profile. As shown, there is some critical temperature, Tc, below which the gas-releasing substance releases essentially none of the gas, but at temperatures above Tc, the gas-releasing substance releases gas quantities that depend on temperature. In other words, below Tc, either no gas at all is released, or only an extremely small, de minimis, or negligible amount of the gas is released, almost to the point of the released gas being considered nonexistent. Stated another way, the amount of the gas released (or rate of gas release) below Tc, if any, is so minimal or insignificant that it can be disregarded for practical purposes. Stated yet another way, any quantity of the gas released below Tc is so tiny that it is functionally equivalent to none.

In the illustrated example, above Tc, the quantity of gas released by the gas-releasing substance generally increases with increasing temperature. The quantity of gas released is said to "generally increase" because the amount of gas released (or the rate of gas release) exhibits a discernible upward trend, indicating a consistent and overall positive increase in the amount of gas released (or, equivalently, the rate of gas release) as a function of temperature. The amount of gas released (e.g., per unit of time) by a particular temperature-selective gas-releasing substance need not be a strictly monotonically increasing (or nondecreasing) function of temperature, however. There can be instances of local variability in the amount of gas released (or the gas release rate) as a function of temperature, causing deviations from the overarching upward trend. These fluctuations do not significantly alter or derail the overall upward trajectory of the gas-release profile above Tc.

The value of Tc and the shape (e.g., slope or upward trend above Tc) of the gas-release profile are dependent on the gas-releasing substance selected. The value of Tc can be, for example, between about 40 degrees Celsius and about 200 degrees Celsius. As a specific example, the value of Tc can be around 45 degrees Celsius, which is typically within the operating temperature range for a data storage device 500. The operating temperature range (also referred to as the range of expected operating temperatures) for the data storage device 500 refers to some range of temperatures the data storage device 500 is expected to (or designed to) experience during operation and does not necessarily include (but also does not exclude) the entire range of expected operating temperatures for the data storage device 500. Accordingly, a gas-releasing substance with a gas-release profile such as shown in FIG. 3A would be suitable for use in passive compensation and/or active compensation. In some embodiments, the identity and quantity of the gas-releasing substance are selected so that the release of gas under the expected temperature and pressure conditions substantially matches the consumption of gas by the data storage device 500. In other words, the gas-release profile of the gas-releasing substance can be matched to the expected operating conditions so that the total amount of the gas inside of the data storage device 500 remains substantially consistent.

Substances that have gas-release profiles similar to that shown in FIG. 3A include metal-organic frameworks (MOFs). As will be understood by those having ordinary skill in the art, a MOF, which is sometimes also referred to as a porous coordination polymer, is a material that is composed of metal ions or clusters coordinated to organic molecules, forming a porous three-dimensional structure. In a MOF, metal ions or metal clusters (e.g., transition metals like zinc, copper, or aluminum) are connected by organic ligands that serve as linkers between the metal centers. The arrangement of metal ions and organic ligands creates a porous structure with a large internal surface area. Because of the porous nature of MOFs, they can be used to capture certain molecules or atoms and release them in gaseous form. MOFs can thus be particularly efficient for storage of molecules or atoms that will help replenish gas depletion in certain environments. The porosity of a MOF can be adjusted by modifying the choice of metal ions and ligands, which allows the size and shape of the pores to be adjusted. The adsorption and desorption of gaseous molecules by a MOF can be a function of (e.g., controlled by) a variety of conditions/variables, such as, for example, one or more of temperature, pressure, and/or light. Examples of MOFs suitable for use with the techniques described herein include: Cd(bpndc)(4,4'-bpy), Co-BTTri, Co-BDTriP, Co-MOF-74, Co-MOF-74 Composite, Cr3(BTC)2, Cr-BTT, Cu(BDT), Cu(BDTri)L (L=DMF), Cu3(BTC)2, Cu-BTC, Cu-BTC Composite, Fc-MOF-74, Mg3(NDC)3, MIL-100 (Fc), MIL-100(Sc), MIL-101 Composite, MOF-177, PCN-13, PCN-17, PCN-224FcII, UMCM-1, Zn(TCNQ-TCNQ) bpy, K1.09Fc2(bdp)3, K0.82Fc2(bdp)3, K1.88Fc2(bdp)3, K2.07Fc2(bpeb)3, Ni-MOF-74, Ni2(cyclam)2(mtb), MIL-101(Ti), Fe-BTTri, Cu(BDTri)L(L=DEF), Co2C12(BBTA), Co2(OH)2(BBTA), Mg-MOF-74, HKUST-1(Hong Kong University of Science and Technology-1), UMCM-152 (ANUGIA), DIDDOK, XAWVUN&XEBHOC, COF-300, MIL-88C, NU-125, NU-1103, ZIF-8, and/or a zirconium-based MOF (e.g., UiO-66, NU-1000, etc.). It is to be appreciated that these MOFs are merely examples, and that this list of examples is not intended to be limiting or comprehensive.

A variety of techniques are known for charging a MOF, where charging is the process of introducing gas molecules (e.g., oxygen) into the MOF's porous structure or onto its surface. As will be appreciated by those having ordinary skill in the art, the specific method for charging a MOF can vary depending on the desired outcome and the MOF's properties. In some embodiments, after choosing and synthesizing a MOF (e.g., by mixing metal ions or clusters with organic ligands in a solvent under controlled conditions to promote MOF formation), guest molecules or solvents in the pores of the MOF that are used in the synthesis process can be removed by heating the MOF under vacuum or flowing an inert gas to remove the guest molecules. The MOF can then be exposed to the desired gas or vapor, such as, for example, by immersing the MOF in a sealed container with the gas (e.g., oxygen) or by using a vacuum to facilitate the process.

Figure 3B:
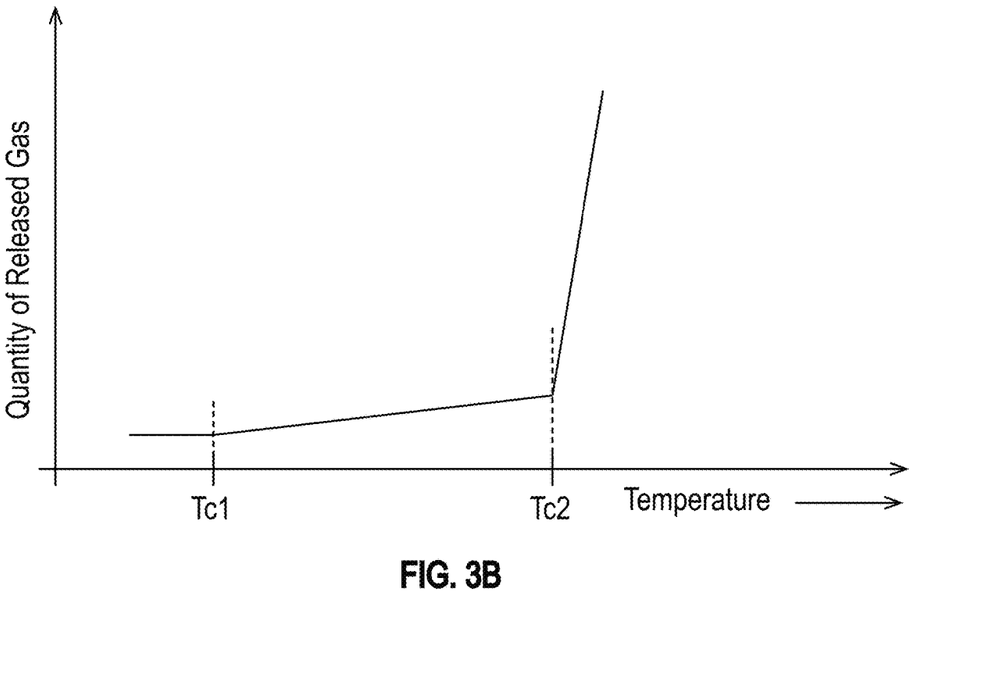
FIG. 3B is a plot showing a gas-release profile of another gas-releasing substance suitable for use in accordance with some embodiments.

FIG. 3B is a plot showing a gas-release profile of another gas-releasing substance suitable for use in accordance with some embodiments. The illustrated gas-release profile of FIG. 3B has two critical temperatures. Below the temperature Tc1, the gas-releasing substance releases essentially no gas. Between the temperature Tc1 and the temperature Tc2, the gas-releasing substance releases a relatively small amount of gas, regardless of the temperature between Tc1 and Tc2. Between Tc1 and Tc2, the gas-releasing substance releases the gas in quantities that generally increase with increasing temperature. Above the temperature Tc2, the gas-releasing substance releases a larger quantity of gas, and small increases in temperature result in substantial increases in the amount of gas released. At temperatures above Tc2, the gas-releasing substance releases the gas in quantities that also generally increase with increasing temperature.

The value of Tc1 can be, for example, between about 50 degrees Celsius and about 100 degrees Celsius. As a specific example, the value of Tc1 can be around 50 degrees Celsius, which is typically within the operating temperature range for a data storage device 500. The value of Tc2 can be, for example, between about 100 degrees Celsius and about 300 degrees Celsius. As a specific example, the value of Tc2 can be around 150 degrees Celsius, which is typically outside of the operating temperature range for a data storage device 500. Accordingly, a gas-releasing substance with a gas-release profile such as shown in FIG. 3B would be suitable for use in passive compensation and/or active compensation. Passive compensation could be used to cause the release of gas at the levels shown between Tc1 and Tc2, and active compensation could be used to heat the gas-releasing substance to higher temperatures (e.g., above Tc2) to cause the gas-releasing substance to release more gas (e.g., per unit of time).

Substances that have gas-release profiles similar to that shown in FIG. 3B include permanganates (e.g., $AgMnO_4$, $KMnO_4$), peroxides (e.g., $H_2O_2$, $CaO_2$, $MgO_2$), perchlorates (e.g., $KClO_3$), perborates (e.g., $NaBO_3 \cdot H_2O$), persulfates (e.g., $K_2S_2O_8$), and percarbonates (e.g., $Na_2CO_3 \cdot 1.5H_2O_2$). As will be understood by those having ordinary skill in the art, permanganate refers to the permanganate ion ($MnO_4^-$) or compounds containing this ion. The permanganate ion is an anion with manganese in the +7 oxidation state. It is a strong oxidizing agent and can be used in various chemical and analytical applications. Potassium permanganate ($KmnO_4$) is an example of a common salt that contains the permanganate ion and can be used for its oxidizing properties. As will also be understood by those having ordinary skill in the art, a peroxide is a chemical compound in which two oxygen atoms are linked together by a single covalent bond. As will also be understood by those having ordinary skill in the art, perchlorate refers to the perchlorate ion ($ClO_4$) or compounds containing this ion. The perchlorate ion is an anion with chlorine in the +7 oxidation state. Perchlorates are salts or esters derived from perchloric acid ($HclO_4$). As will also be understood by those having ordinary skill in the art, perborate refers to the perborate ion ($BO_4^{3-}$) or compounds containing this ion. Perborates are salts or esters derived from perboric acid ($HBO_3$). As will also be understood by those having ordinary skill in the art, a persulfate is a compound containing the anions $SO_5^{2-}$ or $S_2O_8^{2-}$. Persulfate compounds include ammonium persulfate (($NH_4$)$_2S_2O_8$), sodium persulfate ($Na_2S_2O_8$), and potassium persulfate ($K_2S_2O_8$). Persulfates have strong oxidizing properties. As will also be understood by those having ordinary skill in the art, percarbonate typically refers to the carbonate perhydrate anion ($CO_3^{2-} \cdot H_2O_2$), and compounds containing this anion. A compound associated with percarbonate is sodium percarbonate ($2Na_2CO_3 \cdot 3H_2O_2$). The materials and compounds listed or described above may be suitable as the gas-releasing substance when the gas being replaced is oxygen.

It is to be appreciated that the gas-release profiles illustrated in FIGS. 3A and 3B are examples, and that other gas-release profiles are possible (e.g., for other oxygen-releasing materials, for other gas-releasing substances, etc.). It will also be appreciated that the values of Tc1 and Tc2 will depend on the choice of the gas-releasing substance. It will also be appreciated that for a selected gas-releasing substance, changes in pressure, gas environment, and the like may have an effect on the exact values of Tc1 and Tc2. These variables may also have an effect on the shape (e.g., slope, upward trends, etc.) of the gas-release profile.

Figure 4A:
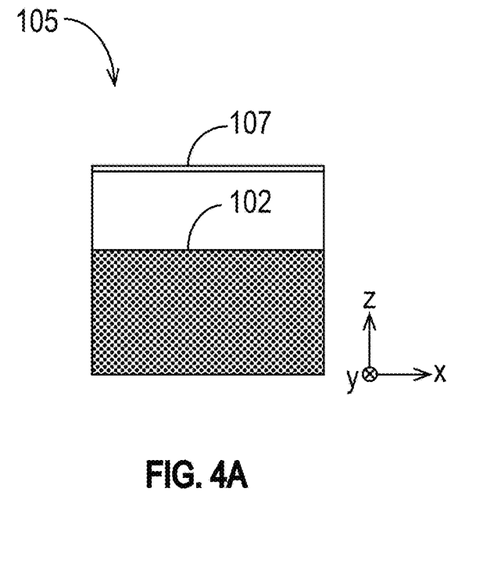
FIG. 4A and FIG. 4B illustrate an example of a container in accordance with some embodiments.
Figure 4B:
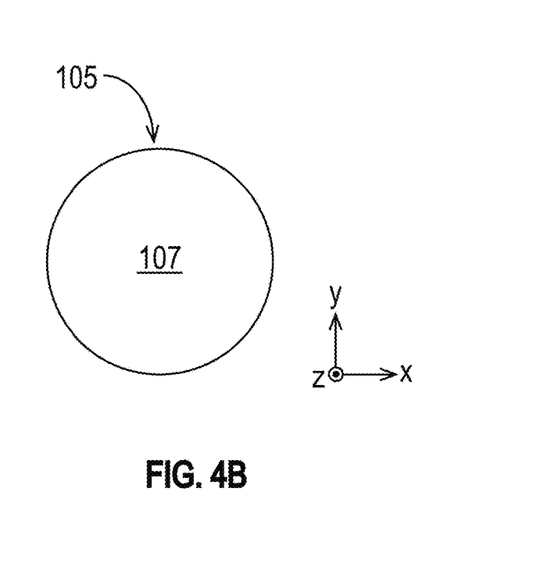

As explained above, the gas-releasing substance can be in a container situated in the data storage device 500. FIG. 4A and FIG. 4B illustrate an example of a container 105 that can be used to store the gas-releasing substance in accordance with some embodiments. FIG. 4A is a cross-section view of the container 105 from the side, and FIG. 4B is a view of the container 105 from the top. In the example of FIGS. 4A and 4B, the container 105 has a gas-permeable membrane 107 and contains a gas-releasing substance 102. The gas-releasing substance 102 can be any substance (e.g., a liquid, a powder, etc.) that, in response to temperature changes, can release a gas that is to be replenished within the data storage device 500 as it operates. The release of gas by the gas-releasing substance 102 can be the result of a chemical reaction (e.g., that produces the desired gas (e.g., oxygen)), or the gas-releasing substance 102 can be a substance that adsorbs the gas and then releases it in response to a stimulus (e.g., a MOF that adsorbs the gas during a charging process and then releases molecules of the gas in response to heat, light, a magnetic field, etc.). The gas-permeable membrane 107 may be, for example, similar or identical to an air filter. The gas-permeable membrane 107 allows gas to escape from the container 105 but prevents the gas-releasing substance 102 from leaving the container 105.

The container 105 can be situated anywhere inside of the data storage device 500 where the localized temperature is sufficient to cause the gas-releasing substance 102 to release gas. For example, for passive compensation using a gas-releasing substance 102 having a gas-release profile such as shown in FIG. 3A, the container 105 can be situated anywhere within the data storage device 500 where the local temperature exceeds the critical temperature Tc some or all of the time. As another example, for passive compensation using a gas-releasing substance 102 having a gas-release profile such as shown in FIG. 3B, the container 105 can be situated anywhere within the data storage device 500 where the local temperature exceeds the critical temperature Tc1 and/or the critical temperature Tc2 some or all of the time.

As another example, for active compensation using a gas-releasing substance 102 having a gas-release profile such as shown in FIG. 3A, the container 105 can be situated anywhere within the data storage device 500 where the local temperature can be made (e.g., controlled) to exceed the critical temperature Tc. As yet another example, for active compensation using a gas-releasing substance 102 having a gas-release profile such as shown in FIG. 3B, the container 105 can be situated anywhere within the data storage device 500 where the local temperature can be made (e.g., controlled) to exceed the critical temperature Tc1 and/or the critical temperature Tc2.

The identity and quantity of the gas-releasing substance 102 that is appropriate for a data storage device 500 may depend on a variety of factors. The identity of the gas-releasing substance 102 is the particular compound or combination of compounds (e.g., a particular MOF, a particular combination of MOFs, a particular peroxide, a particular combination of peroxides, etc.). As an example, the identity of the gas-releasing substance 102 will likely depend on, among other things, some or all of: the amount of the desired gas the gas-releasing substance 102 is capable of releasing (e.g., generating in a chemical reaction or storing/releasing (e.g., if a MOF)), the quantity of gas expected to be consumed by the data storage device 500, the gas-release profile of the gas-releasing substance 102, sensitivity of the gas-releasing substance 102 to relative humidity (and expected relative humidity conditions within the data storage device 500) whether gas compensation will be passive and/or active, expected temperatures within the data storage device 500 as it operates, where in the data storage device 500 the container 105 will be situated, the highest temperature that can be achieved in the vicinity of the gas-releasing substance 102 (e.g., such as in the core area 143 of the voice coil 543 winding), a proxy for the highest temperature that can be achieved in the vicinity of the gas-releasing substance 102 (e.g., when the gas-releasing substance 102 is situated in the core area 143 of the voice coil 543 winding, the highest current that can be applied to the voice coil 543), and/or the amount of space available within the data storage device 500. For example, if only passive compensation is to be performed, the identity and quantity of the gas-releasing substance 102, and the placement of the container 105 within the data storage device 500, should be selected so that internal temperatures of the data storage device 500 are sufficient to cause the gas-releasing substance 102 to release a sufficient quantity of gas to compensate for gas consumption (e.g., the local temperature at the location of the container 105 should be greater than Tc if the gas-releasing substance 102 has a gas-release profile like that of FIG. 3A, the local temperature at the location of the container 105 should be greater than Tc1 and/or Tc2 if the gas-releasing substance 102 has a gas-release profile like that of FIG. 3B, etc.). As another example, if both passive and active compensation are to be performed, the identity and quantity of the gas-releasing substance 102, and the placement of the container 105 within the data storage device 500, should be selected so that internal temperatures of the data storage device 500 are sufficient to cause the desired passive compensation, and so that the internal temperature near the container 105 can be controlled to provide sufficient heat for active compensation. In view of the teachings herein, those having ordinary skill in the art will be able to select a particular gas-releasing substance 102 and a quantity of that particular gas-releasing substance 102 suitable for the expected operating conditions of a particular data storage device 500, whether for passive, compensation, active compensation, or both passive and active compensation.

It is also to be appreciated that it may be possible to determine, in advance, a total amount of a gas likely (e.g., expected or estimated) to be consumed by a data storage device 500 during its lifetime, or during a particular, predetermined period of time (e.g., a warranty period, or a specified number of years). For example, it may be possible, via testing and/or modeling, to determine approximately how much oxygen a sealed data storage device 500 is likely to consume during its lifetime, during a warranty period, or during a specified time period (e.g., at least 5 years, etc.). This information can be used to select the identity of the gas-releasing substance 102 and the quantity of the gas-releasing substance 102 to include in the data storage device 500 for active or passive (or both active and passive) gas compensation.

Figure 5:
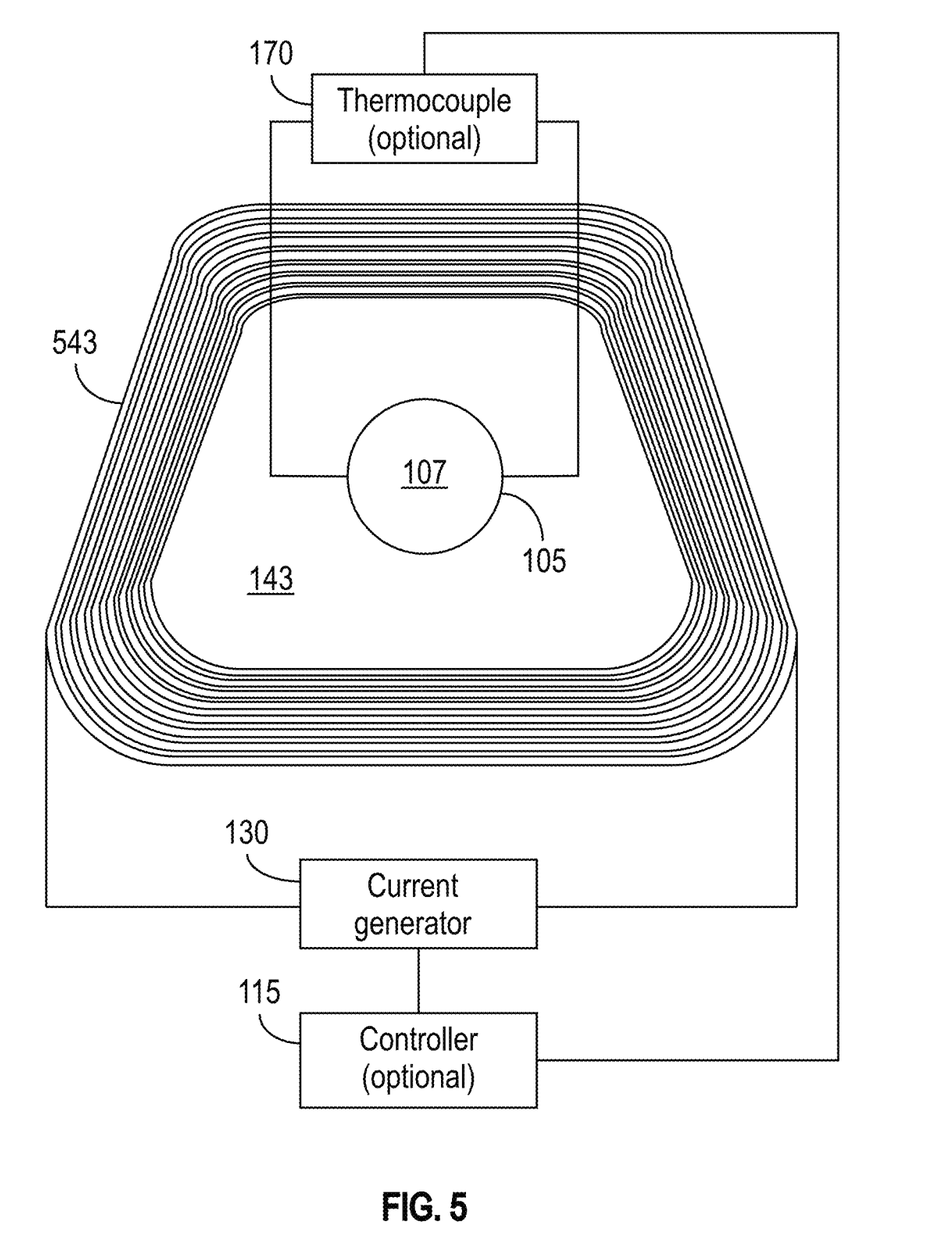
FIG. 5 is a high-level illustration of an example position of the container within the data storage device in accordance with some embodiments.

As explained above, the gas-releasing substance 102 is characterized by a gas-release profile, and whether the gas-releasing substance 102 releases gas, and how much gas it releases, is dependent on temperature in some embodiments. Accordingly, the container 105 can be situated in the data storage device 500 in a location that is expected or known to have an elevated temperature relative to other locations within the data storage device 500. FIG. 5 is a high-level illustration showing an example position of the container 105 within the data storage device 500 in accordance with some embodiments. In the example, the container 105 is situated within the core area 143 of the voice coil 543 winding. As explained above, electric current flows through the voice coil 543 during seeking, reading, and writing operations. FIG. 5 illustrates a current generator 130 that can be included in the data storage device 500 for such operations. When current from the current generator 130 flows through the voice coil 543, the core area 143 is heated due to resistive heating (i.e., the current encounters resistance as it passes through the metal voice coil 543, which causes the metal to heat up and heat the area around it, including the core area 143). Thus, passive compensation can be provided if, during the course of ordinary operation of the data storage device 500 (e.g., seeking, reading, writing operations), the core area 143 is heated to above the critical temperature at which the gas-releasing substance 102 releases gas (e.g., above Tc for a gas-releasing substance 102 having a gas-release profile such as in FIG. 3A, above Tc1 and/or Tc2 for a gas-releasing substance 102 having a gas-release profile such as in FIG. 3B, etc.).

In addition to, or instead of, passive compensation, active compensation can be provided. FIG. 5 shows various components of the data storage device 500 that can be included and involved in the provision of active compensation. If present, the components labeled as optional in FIG. 5 may be included specifically for active compensation, or some or all may already be included in the data storage device 500 for one or more other purposes and can be involved in active compensation as well.

As shown in FIG. 5, the current generator 130 can be coupled to a controller 115 that assists in providing active compensation. As will be appreciated, a controller 115 is a component, device, or subsystem that is responsible for managing and/or regulating the operation of an electric circuit and/or the devices connected to it. A controller 115 can monitor inputs, process information, and generate outputs to ensure that a circuit or system operates as intended. A controller 115 can be used to automate processes, maintain desired conditions, and/or provide control over various aspects of a system's behavior. It will be appreciated that a controller 115 can take various forms, ranging from simple analog devices, state machines, counters, etc. to sophisticated digital microcontrollers, programmable logic controllers (PLCs), etc. The controller 115 illustrated herein can take any suitable form. For example, the controller 115 can be a microcontroller (e.g., an integrated circuit that contains a processing unit (CPU), memory, and input/output ports) that can be programmed to perform the tasks described herein as being performed by a controller 115. As another example, the controller 115 can be a state machine implemented via suitable hardware (e.g., flip flops, gates, etc.). As another example, the controller 115 can be a PLC (e.g., a specialized digital computer that can monitor inputs, make decisions based on programmed logic, and control outputs to automate various processes). As another example, the controller 115 can be a digital signal processor (DSP) programmed to carry out the tasks described herein as being performed by the controller 115. The controller 115 can be included in or implemented by the chip 550 described above in the discussion of FIG. 1.

In some embodiments, the controller 115 controls the current generator 130 to cause current to flow through the winding of the voice coil 543 to provide active compensation. For example, when the slider 528 is parked (e.g., on a ramp) and not over the recording media 516, the current flowing through the voice coil 543 winding could be zero or nonzero. Active compensation can be provided in this case by the controller 115 causing the current generator 130 to generate either a nonzero current or a larger current than currently flowing through the voice coil 543 winding in order to heat the core area 143. For example, if, while the slider 528 is on the ramp, there is no current flowing through the voice coil 543, the controller 115 can cause the current generator 130 to generate a nonzero current through the voice coil 543. Alternatively, if, while the slider 528 is on the ramp, there is a nonzero current flowing through the voice coil 543, the controller 115 can cause the current generator 130 to generate a larger nonzero current than is currently flowing through the voice coil 543. The controller 115 can ensure that the current flowing through the voice coil 543 is sufficient to heat the gas-releasing substance 102 above a critical temperature (e.g., Tc, Tc1, Tc2, etc.), which causes the gas-releasing substance 102 to release gas. As another example, the slider 528 may be flying over the recording media 516, but the recording head 529 is not in the process of reading or writing. In this case, the controller 115 can cause the current generator 130 to increase the current flowing through the voice coil 543 in order to heat the core area 143. In other words, to cause current to flow through the winding of the voice coil 543 to heat the gas-releasing substance 102, the controller 115 can either increase the current already flowing through the voice coil 543 winding (e.g., when the slider 528 is over the recording media 516 but not reading or writing), or it can cause a specified amount of current to flow (e.g., from zero current to a nonzero current sufficient to heat the gas-releasing substance 102) (e.g., when the slider 528 is parked).

In some embodiments, the controller 115 is coupled to a temperature sensor that can detect the temperature of (or in the vicinity of) the gas-releasing substance 102. In the example of FIG. 5, the temperature sensor is shown as a thermocouple 170. As will be appreciated by those having ordinary skill in the art, a thermocouple is a type of temperature sensor that consists of two different metals or alloys joined together at one end. The junction of these metals produces a voltage that is dependent on the temperature difference between the junction and the other ends of the metals. By measuring the voltage generated, the temperature at the hot junction can be determined. A terminal of the thermocouple 170 can be inserted into the container 105 to detect the temperature of the gas-releasing substance 102 (or of the interior of the container 105), and the controller 115 can determine how to set the current generator 130 based at least in part on the detected temperature.

Alternatively or in addition, the controller 115 can be coupled to a sensor that detects the level of the gas being consumed within the data storage device 500. The controller 115 can then determine how much current to cause the current generator 130 to apply, and for how long, to cause the gas-releasing substance 102 to release a particular amount of that gas (e.g., an amount sufficient to compensate for an amount of gas consumed).

If present, the sensor may allow the gas level within the interior of the data storage device 500 to be estimated directly (e.g., measured) or indirectly. For example, the gas level can be estimated directly based on a measurement from a sensor (e.g., an oxygen sensor). The gas level can alternatively or also be estimated indirectly using a proxy for gas quantity. For example, in a data storage device 500 that includes rotating media, a current sensor coupled to the spindle motor can provide a proxy for the level of a specified gas (e.g., oxygen) within the data storage device 500. Specifically, the current sensor can provide an indication of the current being used by the spindle motor to cause the recording media 516 to rotate at a specified speed (e.g., the angular speed at which the recording media 516 ordinarily spins when the data storage device 500 is being used). When the oxygen content within the data storage device 500 is higher, the current required to maintain a specified rotation speed is higher than when the oxygen content is lower. Accordingly, the spindle motor current (or power associated with that current) used to rotate the recording media 516 at a specified angular speed can be used as a proxy for the oxygen content within the data storage device 500: when the current is higher, more oxygen is present, and when the current is lower, less oxygen is present.

It is to be appreciated that the thermocouple 170 can be omitted in embodiments in which active compensation is provided. For example, a gas-consumption profile for the data storage device 500 can be known (e.g., based on testing or modeling) in advance of when the data storage device 500 is put into service. The gas-consumption profile may be, for example, a curve similar to one of the curves of FIG. 2. Active compensation can be provided in such a data storage device 500 by the controller 115 causing the current generator 130 to cause (some or more) current to flow through the voice coil 543 sufficient to heat the gas-releasing substance 102 and cause it to release gas in accordance with the applicable gas-release profile (e.g., as in FIG. 3A or FIG. 3B). The controller 115 can perform active compensation in any suitable way. For example, the controller 115 can perform active compensation periodically, according to a schedule (e.g., every day at 2:00 A.M.), in response to a trigger (e.g., whenever the data storage device 500 has been in the idle state (e.g., the slider 528 is parked on the ramp) for a predetermined amount of time), or at any appropriate time (e.g., when the data storage device 500 is in the idle state). When the container 105 is situated in the core area 143 of the voice coil 543 winding, and the data storage device 500 is in use (e.g., the recording head 529 is over the disk but is not reading or reading), active compensation can be provided by increasing the current flowing through the voice coil 543 winding. It will be appreciated that there are many ways the controller 115 can initiate and control active compensation, and the examples provided herein are not intended to be limiting.

Figure 6:
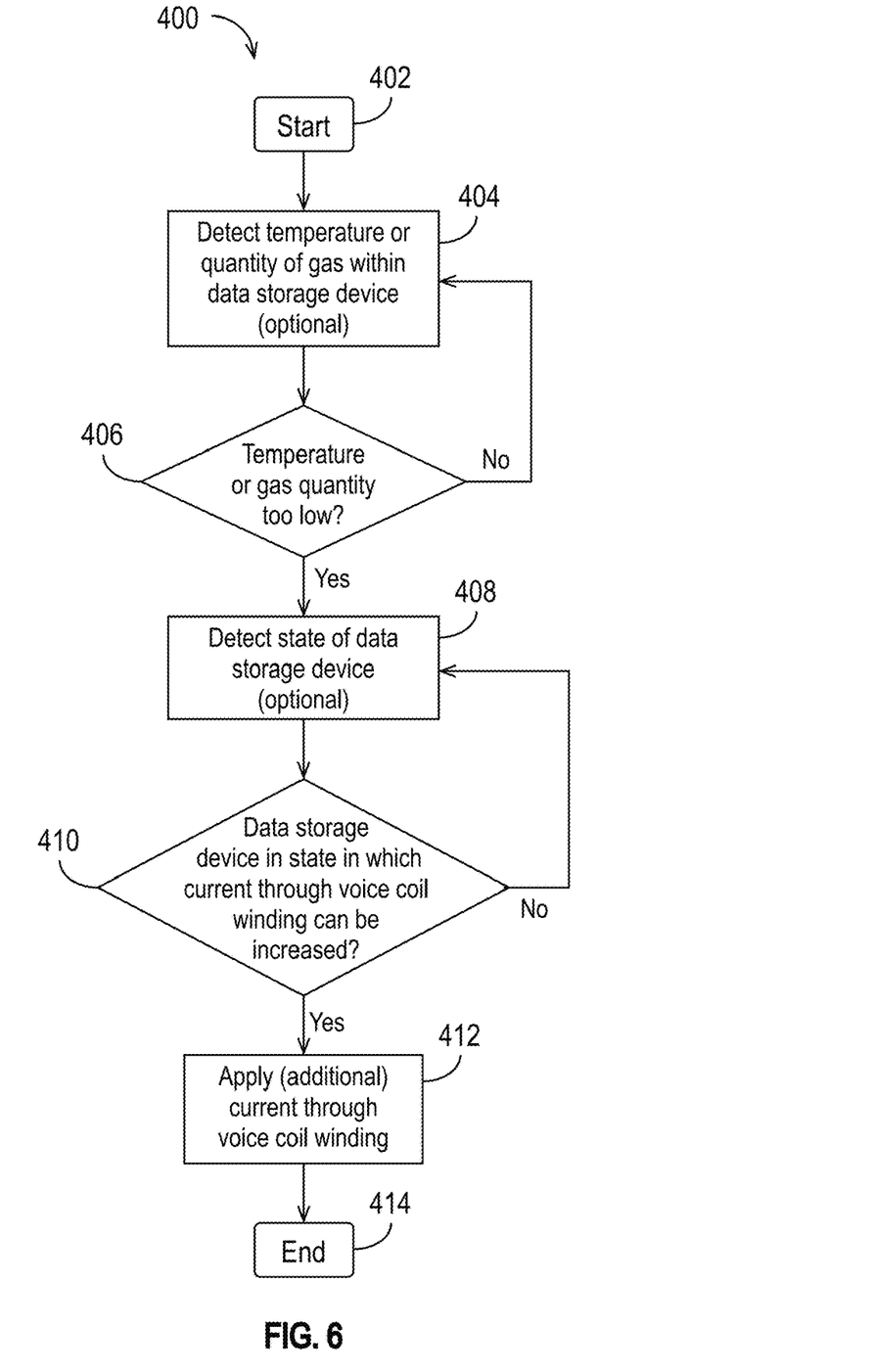
FIG. 6 is a flow diagram of a process of providing active compensation to replenish consumed gas within a data storage device in accordance with some embodiments.

FIG. 6 is a flow diagram of a process 400 of providing active compensation to replenish consumed gas within a data storage device 500 in accordance with some embodiments. In the data storage device 500 that performs the process 400, a container 105 that contains a gas-releasing substance 102 is situated within the core area 143 of the voice coil 543 winding. The data storage device 500 includes a controller 115 and, optionally, a temperature sensor (e.g., a thermocouple 170).

At block 402, the method begins. Optionally, at block 404, the temperature or quantity of gas within the data storage device 500 is detected (e.g., estimated). As explained above, the estimate can be determined using a sensor (e.g., a thermocouple 170, a gas sensor, etc.) or based on information that provides an indication of the quantity of a gas inside the data storage device 500 (e.g., a spindle motor current or power consumption). A temperature estimate/measurement may be used (e.g., in conjunction with the time the data storage device 500 has been in service and the expected gas-consumption profile of the data storage device 500) to estimate the quantity of gas in the data storage device 500.

At block 406, it is determined whether the temperature or quantity of gas within the data storage device 500 is too low. If not, the process 400 returns to the block 404.

If, at block 406, it is determined that the temperature or quantity of gas within the data storage device 500 is too low, the process 400 proceeds to block 408, which is optional. At block 408, the state of the data storage device 500 is detected. For example, it may be detected at block 408 whether the data storage device 500 is in a state in which the current flowing through the voice coil 543 winding can be increased either from zero or from its current value (e.g., such that taking actions to cause the gas-releasing substance 102 to release gas would not interfere with or delay seeking/reading/writing operations).

At block 410, which follows block 408, it is determined whether the data storage device 500 is in a state in which the current flowing through the voice coil 543 winding can be increased either from zero (e.g., the slider 528 is parked on the ramp and there is no current flowing through the voice coil 543) or from its current value (e.g., the slider 528 is over the recording media 516 but is not reading or writing, or the slider 528 is parked on the ramp and there is a nonzero current flowing through the voice coil 543, etc.). If not, the process 400 returns to block 408. If, at block 410, it is determined that the data storage device 500 is in a state in which the current flowing through the voice coil 543 winding can be increased, the process 400 proceeds to the block 412.

At block 412, a current is applied to the voice coil 543 (e.g. while the data storage device 500 is in the state in which the current flowing through the voice coil 543 winding can be increased). The current can be increased from zero, or it can be increased from a current already flowing through the voice coil 543 for ordinary data storage device 500 operation (e.g., the current through the voice coil 543 winding can increase from zero current to a nonzero current sufficient to heat the gas-releasing substance 102, or it can increase from a nonzero current to a larger nonzero current). For example, referring to FIG. 5, when the slider 528 is parked, and no current is flowing through the voice coil 543 winding, a controller 115 can cause a current generator 130 to cause a current to flow through the voice coil 543 winding. As another example, when the slider 528 is over the recording media 516 but is not reading or writing, the controller 115 can increase the current flowing through the voice coil 543 winding. As explained above, the current (or additional current) causes the core area 143 to be heated, which heats the gas-releasing substance 102 in the container 105 situated in the core area 143, which causes the gas-releasing substance 102 to release gas into the interior of the data storage device 500. At block 414, the process 400 ends.

It is to be appreciated that if block 404 is not performed, then block 406 is also not performed. In this case, the process 400 bypasses block 404 and block 406. Similarly, if block 408 is not performed, then block 410 is also not performed. In this case, the process 400 bypasses block 408 and block 410. Accordingly, the process 400 can omit any of the following: (a) block 404 and block 406 only (in which case the process 400 proceeds from block 402 to block 408); (b) block 408 and block 410 only (in which case the process 400 proceeds from block 406 to block 412); (c) all of block 404, block 406, block 408, and block 410 (in which case the process 400 proceeds from block 402 to block 412).

Figure 7:
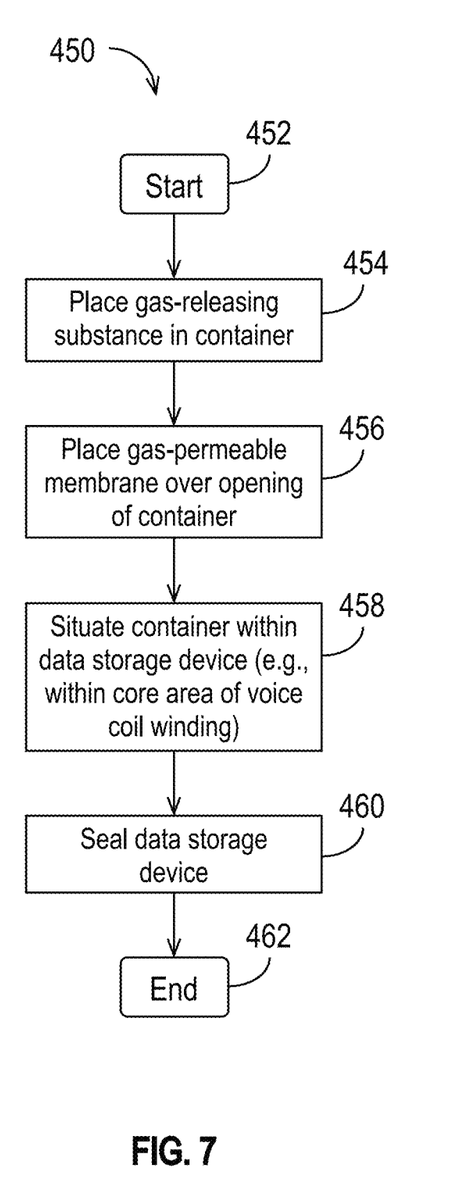
FIG. 7 is a flow diagram of a method of manufacturing a data storage device in accordance with some embodiments.

FIG. 7 is a flow diagram of a method 450 of manufacturing a data storage device 500 in accordance with some embodiments. At block 452, the method 450 begins. At block 454, a gas-releasing substance 102 is placed in a container 105. At block 456, a gas-permeable membrane 107 is placed over an opening of the container 105. As explained above, the gas-permeable membrane 107 allows gas to escape the container 105 but prevents the gas-releasing substance 102 from leaving the container 105. At block 458, the container 105 is situated in the data storage device 500. In the illustrated method 450, the container 105 is situated in the core area 143 of the voice coil 543 winding. At block 460, the data storage device 500 is sealed. At block 462, the method 450 ends.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A data storage device, comprising:
   a container comprising a gas-permeable membrane;
   a temperature-sensitive gas-releasing substance inside of the container,
      wherein the temperature-sensitive gas-releasing substance is characterized by a gas-release profile, wherein:
         below a critical temperature, the temperature-sensitive gas-releasing substance releases essentially none of a particular gas, and
         above the critical temperature, and within a range of expected operating temperatures of the data storage device, the temperature-sensitive gas-releasing substance releases the particular gas in quantities that generally increase with increasing temperature;
   a voice coil comprising a winding; and
   a current generator coupled to the voice coil and configured to cause a current to flow through the winding, wherein the container is situated within a core area of the winding.

2. The data storage device recited in claim 1, wherein the particular gas is oxygen.

3. The data storage device recited in claim 2, wherein the temperature-sensitive gas-releasing substance comprises at least one of a permanganate, a peroxide, a perchlorate, a perborate, a persulfate, or a percarbonate.

4. The data storage device recited in claim 3, wherein the temperature-sensitive gas-releasing substance comprises at least one of: $AgMnO_4$, $KMnO_4$, $H_2O_2$, $CaO_2$, $MgO_2$, $KClO_3$, $NaBO_3 \cdot H_2O$, $K_2S_2O_8$, or $Na_2CO_3 \cdot 1.5H_2O_2$.

5. The data storage device recited in claim 1, wherein the temperature-sensitive gas-releasing substance comprises a metal-organic framework.

6. The data storage device recited in claim 5, wherein the metal-organic framework comprises at least one of: Cu-BTC, MIL-101 Composite, UMCM-152 (ANUGIA), or Mg-MOF-74.

7. The data storage device recited in claim 1, wherein the critical temperature is between about 40 degrees Celsius and about 200 degrees Celsius.

8. The data storage device recited in claim 1, wherein an amount of the temperature-sensitive gas-releasing substance inside of the container is selected such that the temperature-sensitive gas-releasing substance is capable of releasing a quantity of the particular gas that is substantially equal to an expected amount of the particular gas to be consumed by one or more components of the data storage device during a specified period of time.

9. The data storage device recited in claim 8, wherein the specified period of time is an expected lifetime or a warranty period of the data storage device.

10. The data storage device recited in claim 8, wherein the specified period of time is at least 5 years.

11. The data storage device recited in claim 1, wherein the critical temperature is a first critical temperature, and wherein, at temperatures above a second critical temperature, the second critical temperature being higher than the first critical temperature, the temperature-sensitive gas-releasing substance releases larger quantities of gas than at temperatures between the first critical temperature and the second critical temperature.

12. The data storage device recited in claim 11, wherein the first critical temperature is between about 50 degrees Celsius and about 100 degrees Celsius, and the second critical temperature is between about 100 degrees Celsius and about 300 degrees Celsius.

13. The data storage device recited in claim 1, wherein the critical temperature of the temperature-sensitive gas-releasing substance is less than an expected temperature within the core area during an operational state of the data storage device.

14. The data storage device recited in claim 13, wherein the operational state is a state in which the current flows through the winding.

15. The data storage device recited in claim 14, wherein the operational state is a seeking state.

16. The data storage device recited in claim 1, further comprising a controller configured to cause the current generator to generate the current to heat the temperature-sensitive gas-releasing substance to a temperature above the critical temperature.

17. The data storage device recited in claim 1, further comprising a controller configured to:
   determine that the data storage device is in a state in which a voice coil motor current can be increased; and in response to determining that the data storage device is in the state in which the voice coil motor current can be increased, cause the current generator to generate the current to heat the temperature-sensitive gas-releasing substance while the data storage device is in the state in which the voice coil motor current can be increased.

18. The data storage device recited in claim 17, wherein, in the state in which the voice coil motor current can be increased, (a) a slider of the data storage device is parked, or (b) a recording head of the data storage device is over a recording media of the data storage device but is not reading from or writing to the recording media.

19. The data storage device recited in claim 1, further comprising:
  a thermocouple coupled to the container and configured to detect a temperature in a vicinity of the temperature-sensitive gas-releasing substance; and
  a controller coupled to the thermocouple and configured to cause the current generator to generate the current in response to the detected temperature in the vicinity of the temperature-sensitive gas-releasing substance.

20. A method of replenishing consumed gas within a sealed data storage device, the sealed data storage device comprising a container situated within a core area of a voice coil winding, the container containing a temperature-sensitive gas-releasing substance having a critical temperature below which the temperature-sensitive gas-releasing substance releases essentially none of a particular gas, and above which the temperature-sensitive gas-releasing substance releases the particular gas in quantities that generally increase with increasing temperature, wherein an amount of the temperature-sensitive gas-releasing substance is capable of releasing a quantity of the particular gas expected to be consumed as the sealed data storage device operates, the method comprising:
  applying a current through the voice coil winding, thereby increasing a temperature of the temperature-sensitive gas-releasing substance above the critical temperature, thereby causing the temperature-sensitive gas-releasing substance to release molecules of the particular gas.

21. The method of claim 20, wherein applying the current through the voice coil winding is performed when the sealed data storage device is in a state in which a voice coil motor current can be increased.

22. The method of claim 21, further comprising:
  detecting that the sealed data storage device is in the state in which a voice coil motor current can be increased.

23. The method of claim 22, wherein, in the state in which the voice coil motor current can be increased, (a) a slider of the sealed data storage device is parked, or (b) a recording head of the sealed data storage device is over a recording media of the sealed data storage device but is not reading from or writing to the recording media.

24. The method of claim 20, further comprising:
  detecting a temperature or a quantity of the particular gas within the sealed data storage device,
  and wherein applying the current through the voice coil winding is in response to detecting the temperature or the quantity of the particular gas within the sealed data storage device.

25. A method of manufacturing a data storage device, comprising:
  placing a temperature-sensitive gas-releasing substance inside of a container, wherein the temperature-sensitive gas-releasing substance is capable of releasing a quantity of a particular gas, the quantity of the particular gas being sufficient to replace an amount of the particular gas expected to be consumed as the data storage device operates;
  placing a gas-permeable membrane over an opening of the container, the gas-permeable membrane allowing molecules of the particular gas to escape from the container and preventing the temperature-sensitive gas-releasing substance from leaving the container;
  situating the container within a core area of a voice coil winding of the data storage device; and
  sealing the data storage device.

26. The method of claim 25, wherein the temperature-sensitive gas-releasing substance comprises a metal-organic framework, and further comprising charging the metal-organic framework.

* * * * *